(12) United States Patent
Iwakiri et al.

(10) Patent No.: US 9,308,509 B2
(45) Date of Patent: Apr. 12, 2016

(54) REFORMER

(75) Inventors: Yasunori Iwakiri, Yokohama (JP);
Takao Izumi, Yokosuka (JP)

(73) Assignee: NISSAN MOTOR CO., LTD.,
Yokohama-shi (JP)

( * ) Notice: Subject to any disclaimer, the term of this patent is extended or adjusted under 35 U.S.C. 154(b) by 442 days.

(21) Appl. No.: 13/819,588

(22) PCT Filed: Apr. 18, 2012

(86) PCT No.: PCT/JP2012/060439
§ 371 (c)(1),
(2), (4) Date: Feb. 27, 2013

(87) PCT Pub. No.: WO2012/165077
PCT Pub. Date: Dec. 6, 2012

(65) Prior Publication Data
US 2013/0160364 A1    Jun. 27, 2013

(30) Foreign Application Priority Data

Jun. 1, 2011   (JP) .................. 2011-123128

(51) Int. Cl.
*B01J 7/00*       (2006.01)
*C01B 3/38*       (2006.01)
*B01J 19/24*      (2006.01)
*H01M 8/06*       (2006.01)

(52) U.S. Cl.
CPC  *B01J 7/00* (2013.01); *B01J 19/249* (2013.01); *C01B 3/384* (2013.01); *H01M 8/0612* (2013.01); *B01J 2219/2453* (2013.01); *B01J 2219/2458* (2013.01); *B01J 2219/2465* (2013.01); *B01J 2219/2474* (2013.01); *B01J 2219/2479* (2013.01); *B01J 2219/2493* (2013.01); *C01B 2203/0277* (2013.01); *C01B 2203/066* (2013.01); *C01B 2203/0811* (2013.01); *C01B 2203/0822* (2013.01); *C01B 2203/1035* (2013.01); *Y02E 60/50* (2013.01); *Y02P 20/128* (2015.11)

(58) Field of Classification Search
CPC combination set(s) only.
See application file for complete search history.

(56) References Cited

U.S. PATENT DOCUMENTS 4,423,022 A * 12/1983 Albano .................. B01J 8/0005
                                                   423/359
5,015,444 A *  5/1991 Koga et al. .................... 422/625

(Continued)

FOREIGN PATENT DOCUMENTS

JP   03-208803 A   9/1991
JP   2002-080203 A  3/2002
JP   2005-298260 A  10/2005

OTHER PUBLICATIONS

Supplementary European Search Report dated Oct. 9, 2014, 5 pgs.

*Primary Examiner* — Kaity Handal
(74) *Attorney, Agent, or Firm* — Foley & Lardner LLP

(57) ABSTRACT

A reformer 1 of the present invention is formed by stacking each other a reforming layer 2 configured to reform a reforming fuel with a reforming catalyst 5, and a heating layer 3 configured to heat the reforming layer 2 through an exothermic reaction with a combustion catalyst 8. A gas mixture obtained by mixing a to-be-combusted gas with a combustion-assisting gas is supplied to a heating passage 25 in the heating layer 3. The heating passage 25 is separated into multiple separation passages 31a to 31c by separation walls 11, 13 parallel to a wall surface coated with the combustion catalyst 8. The multiple separation passages 31a to 31c respectively eject the gas mixture to different positions of the combustion catalyst 8.

10 Claims, 8 Drawing Sheets

(56) References Cited

U.S. PATENT DOCUMENTS

| | | | | |
|---|---|---|---|---|
| 5,776,421 A | * | 7/1998 | Matsumura | B01J 12/007 422/601 |
| 6,159,434 A | * | 12/2000 | Gonjo et al. | 422/626 |
| 2004/0031592 A1 | | 2/2004 | Mathias et al. | |
| 2007/0072950 A1 | * | 3/2007 | Lee | C01B 3/48 518/702 |
| 2009/0311150 A1 | * | 12/2009 | Cho | C01B 3/34 422/600 |
| 2009/0326279 A1 | * | 12/2009 | Tonkovich | B01F 5/0475 568/487 |

* cited by examiner

REFORMER

TECHNICAL FIELD

The present invention relates to a reformer including a reforming layer and a heating layer stacked on each other, and particularly to a reformer configured to supply a reformed gas by heating a reforming layer through an exothermic reaction with a combustion catalyst.

BACKGROUND ART

Because of increasing concern about global environmental problems, the utilization of various fuel cells has been studied recently. Among these, in a case of a solid oxide fuel cell having a high efficiency, a hydrogen-rich gas is supplied as a fuel gas, and power is generated by an electrochemical reaction of oxygen used as an oxidant with hydrogen, carbon monoxide, and hydrocarbons.

Moreover, for the fuel gas, a method may be adopted which supplies a reformed gas obtained by reforming a liquid fuel. In such reforming, a high-carbon organic liquid including gasoline is vaporized and gasified or a fuel gas is used as a reforming fuel. The reforming is performed by introducing the reforming fuel into a reformer together with other components necessary for the reforming reaction. In this event, the reforming fuel is reformed with a reforming catalyst in the reformer. Since the reforming reaction requires heat, it is important to widely supply the whole area of the reforming catalyst with heat in a right amount without excess and deficiency.

Hence, there have been conventionally proposed reformers having a structure, in which a combustion layer and a reforming layer are separated. Patent Literature 1 discloses an example of such reformers. In the reformer disclosed in Patent Literature 1, a combustion passage and a reforming passage are disposed with a wall therebetween, and a combustion gas supplied to the combustion passage is combusted on a combustion catalyst to generate heat. This heat is conducted to a reforming catalyst in the reforming passage for a reforming reaction in the reforming layer.

Conventionally, in such a reformer, one of simplest ways of supplying a combustion gas is that a to-be-combusted gas and a combustion-assisting gas are mixed together in advance at the outside and are supplied as the combustion gas to the reformer. Nevertheless, in this method, occurrence of an exothermic reaction is localized near an inlet of the combustion passage. This brings about problems that a sufficient amount of heat is not obtained on a downstream side of the combustion passage, and a reforming reaction does not take place sufficiently there.

For this reason, in the reformer disclosed in Patent Literature 1, a to-be-combusted gas is introduced separately from a combustion-assisting gas by using a pipe to a site where heat is desired to be generated in the combustion passage, so that an exothermic reaction takes place on the entire combustion catalyst.

CITATION LIST

Patent Literature

Patent Literature 1: Japanese Patent Application Publication No. 2002-80203

SUMMARY OF INVENTION

However, in the reformer disclosed in Patent Literature 1 described above, since the pipe is used to introduce a to-be-combusted gas to each site in the combustion passage, a problem is brought about that the device is complicated by the arrangement of the pipe and so forth. Particularly, the larger the number of combustion layers stacked, the more the complexity of the device. It is important to solve this problem.

Therefore, the present invention has been proposed in view of the above-described circumstances. An object of the present invention is to provide a reformer having a simple structure and enabling an exothermic reaction to take place widely on an entire combustion catalyst.

A reformer according to the present invention is formed by stacking each other a reforming layer configured to reform a reforming fuel with a reforming catalyst, and a heating layer configured to heat the reforming layer through an exothermic reaction with a combustion catalyst. A gas mixture obtained by mixing a to-be-combusted gas with a combustion-assisting gas is supplied to a heating passage in the heating layer. Moreover, the heating passage is separated into multiple separation passages by a separation wall parallel to a wall surface coated with the combustion catalyst. The multiple separation passages respectively eject the gas mixture to different positions of the combustion catalyst.

DESCRIPTION OF EMBODIMENTS

Hereinafter, first to fourth embodiments to which the present invention is applied will be described with reference to the drawings.

First Embodiment

[Configuration of Reformer]

Figure 1:
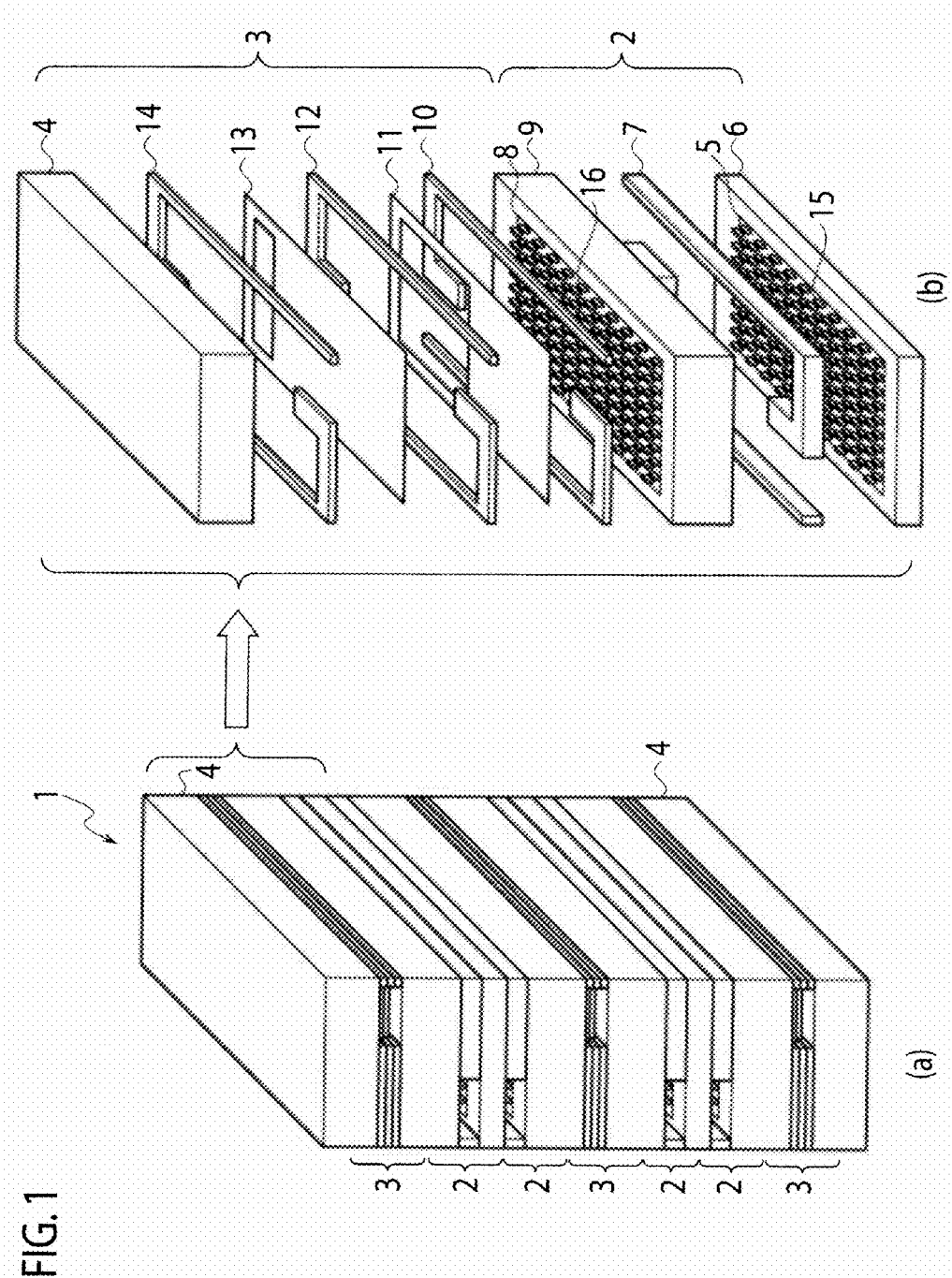
FIG. 1 shows views for illustrating a structure of a reformer according to a first embodiment to which the present invention is applied.

FIG. 1 shows views for illustrating a structure of a reformer according to the present embodiment. FIG. 1(a) is a perspective view for illustrating the entire configuration, and FIG. 1(b) is an exploded perspective view of a reforming layer and a heating layer.

As shown in FIG. 1(a), a reformer 1 according to the present embodiment includes reforming layers 2 each configured to reform a reforming fuel with a reforming catalyst, heating layers 3 each configured to heat the reforming layer 2 through an exothermic reaction with a combustion catalyst, the layers stacked on each other, and outer walls 4 stacked on the uppermost and lowermost layers. In the structure illustrated in FIG. 1(a), the four reforming layers 2 and the three heating layers 3 are stacked, but the number of the layers stacked is not limited thereto.

Figure 2:
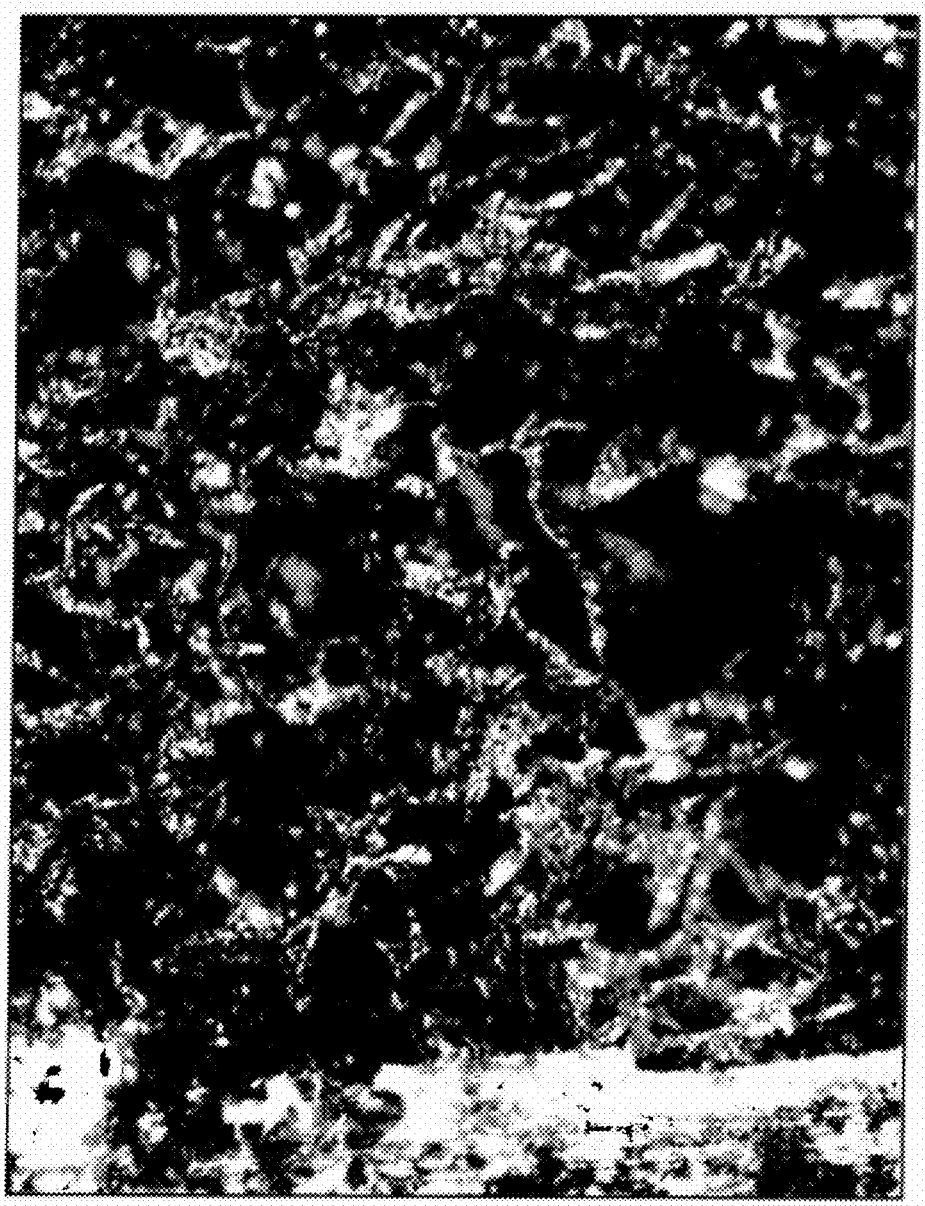
FIG. 2 shows a view for illustrating a porous metal disposed in the reformer according to the first embodiment to which the present invention is applied.

Next, structures of the reforming layer 2 and the heating layer 3 will be described with reference to FIG. 1(b). As shown in FIG. 1(b), the reforming layer 2 is formed by stacking each other: a metal plate 6 coated with a reforming catalyst 5; a metal frame 7 configured to define a height of a reforming passage; and a metal plate 9 having a lower surface closer to the reforming layer and coated with the reforming catalyst 5, and an upper surface closer to the heating layer and coated with a combustion catalyst 8. Here, a diffusion structure 15 is disposed on the metal plate 6 so that a reforming fuel flowing thereto can diffuse. This diffusion structure 15 is, for example, fins arranged in a zigzag manner shown in FIG. 1(b), a porous metal shown in FIG. 2, a baffle board, or the like.

The heating layer 3 is formed by stacking each other: the metal plate 9 coated with the combustion catalyst 8; a first metal frame 10 configured to define part of a height of a heating passage; a first separation wall 11, which is a metal plate having a wall surface provided with an opening in a portion thereof; a second metal frame 12 configured to define part of the height of the heating passage; a second separation wall 13, which is a metal plate provided with an opening at a position different from that of the first separation wall 11; a third metal frame 14 configured to define part of the height of the heating passage; and the outer wall 4 formed from a metal plate. In addition, a diffusion structure 16 is disposed on the metal plate 9 coated with the combustion catalyst 8 so that a to-be-combusted gas and a combustion-assisting gas flowing thereto can diffuse. This diffusion structure 16 is, for example, the fins arranged in a zigzag manner shown in FIG. 1(b), the porous metal shown in FIG. 2, the baffle board, or the like.

Here, heights of the first to third metal frames 10, 12, 14 configured to define the parts of the height of the heating passage are equal to a divided height of a normal heating passage, and are not to increase the height of the entire heating passage. For example, the height of each of the first to third metal frames 10, 12, 14 is approximately 0.2 mm, and a height of the metal frame 7 defining the height of the reforming passage is approximately 0.5 mm.

The stacked reformer 1 according to the present embodiment can be produced by stacking each other the reforming layer 2 and the heating layer 3 having such configurations, and joining outer peripheral surfaces thereof together by welding.

Figure 3:
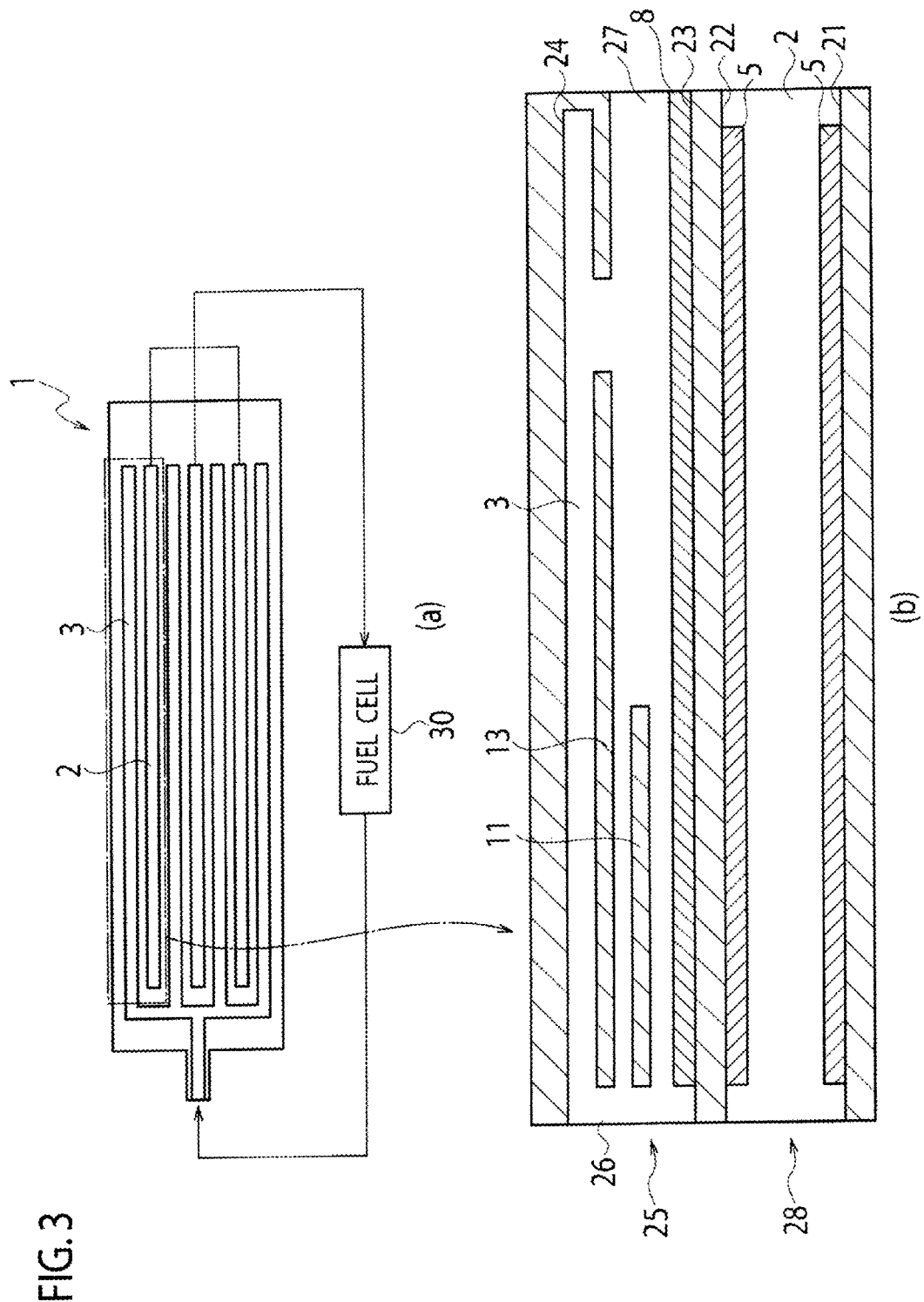
FIG. 3 shows views for illustrating, in detail, cross-sectional structures of a reforming layer and a heating layer of the reformer according to the first embodiment to which the present invention is applied.

Next, cross-sectional structures of the reforming layer 2 and the heating layer 3 will be described in detail with reference to FIG. 3. As shown in FIG. 3(a), the reformer 1 according to the present embodiment is formed by stacking the reforming layer 2 and the heating layer 3 each other, and a reformed gas reformed by the reforming layer 2 is supplied to a fuel cell 30. Then, components remaining after a reaction by the fuel cell 30 circulate as a to-be-combusted gas to the heating layers 3.

FIG. 3(b) shows an enlarged sectional view of the reforming layer 2 and the heating layer 3 of the reformer 1 having the configuration as described above. As shown in FIG. 3(b), in the reforming layer 2, each of passage walls 21, 22, which are parallel walls, is coated with the reforming catalyst 5; in the heating layer 3, only a passage wall 23 of passage walls 23, 24, which are parallel walls, is coated with the combustion catalyst 8. The passage wall 23 is located adjacent to the reforming layer 2.

A gas mixture obtained by mixing a to-be-combusted gas with a combustion-assisting gas is supplied to a heating passage 25 in the heating layer 3. The heating passage 25 is separated into multiple separation passages by the first and second separation walls 11, 13 parallel to the wall surface coated with the combustion catalyst 8. Moreover, the openings of the first separation wall 11 and the second separation wall 13 are arranged at different positions from each other in such a manner that the multiple separation passages respectively eject the gas mixture to different positions of the combustion catalyst 8. Further, an opening area of an inlet 26 through which the gas mixture flows into the heating layer 3 is set wider than an opening area of an outlet 27 through which the gas mixture flows out. Note that, the present embodiment describes an example where the three separation passages are separated by the two separation walls, but the number of separation passages may be two, or may be larger than three.

Meanwhile, in the reforming layer 2, a reforming fuel gas is supplied to the reforming passage 28, a reforming reaction takes place with the reforming catalyst 5, and a reformed gas is outputted.

[Function of Reformer]

Figure 4:
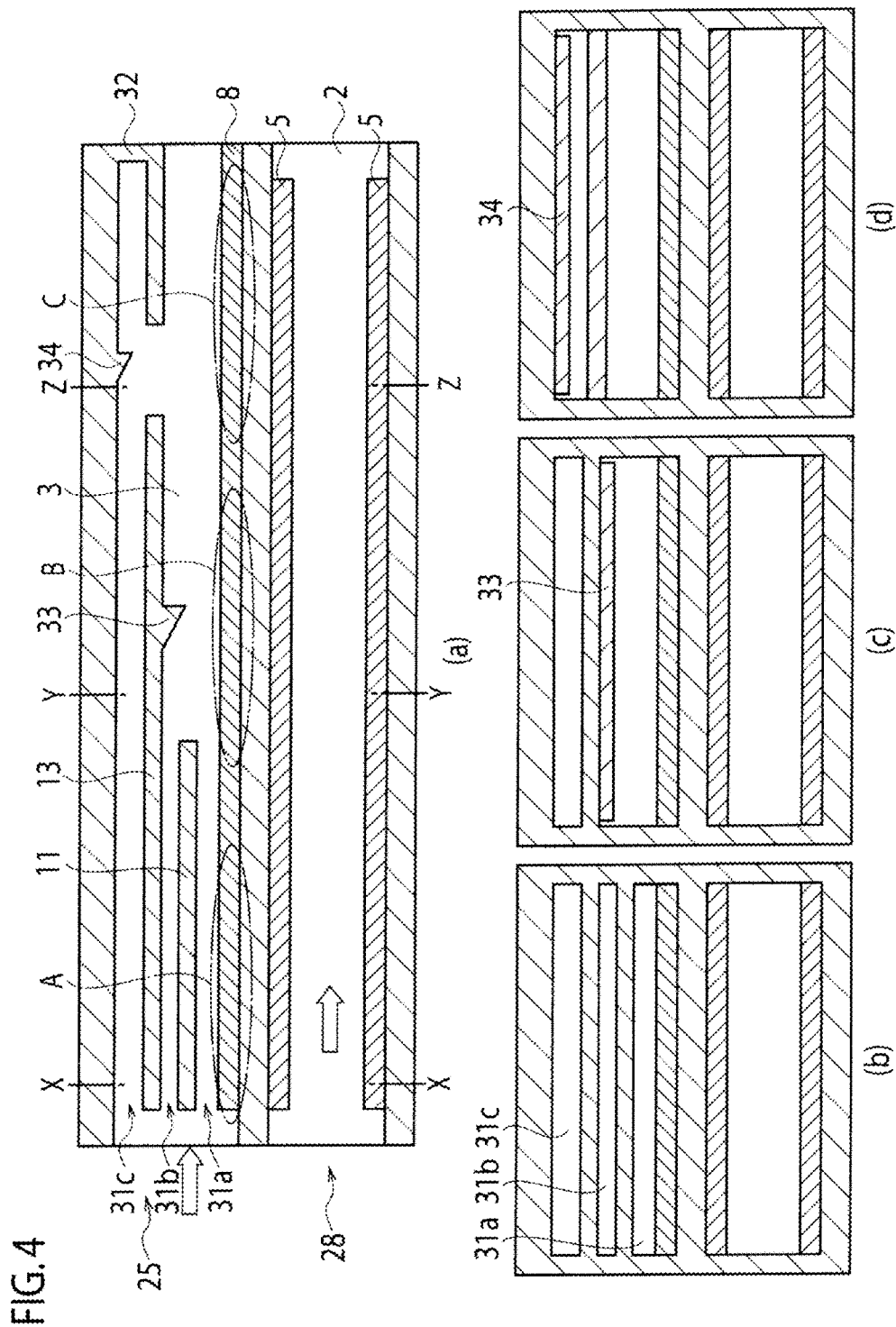
FIG. 4 shows views for illustrating, in detail, cross-sectional structures of the reforming layer and the heating layer of the reformer according to the first embodiment to which the present invention is applied.

Next, functions of the reforming layer 2 and the heating layer 3 will be described with reference to FIG. 4. FIG. 4(a) is an enlarged sectional view of the reforming layer 2 and the heating layer 3, and FIGS. 4(b), (c), (d) are respectively cross-sectional views taken along X-X, Y-Y, Z-Z in FIG. 4(a). The description will be given with FIG. 4 of a case where a direction in which a gas flows in the reforming layer 2 is the same as a direction in which a gas flows in the heating layer 3.

As shown in FIG. 4(a), the two first separation wall 11 and second separation wall 13 separate the heating passage 25 in the heating layer 3 into three separation passages 31a, 31b, 31c in the order closest to the reforming layer 2.

In the heating layer 3, a to-be-combusted gas such as hydrocarbon fuel and hydrogen and a combustion-assisting gas such as air mixed in advance flow into the heating passage 25. The gas mixture thus flowed is separated and continues to flow into the three separation passages 31a, 31b, 31c. Then, since the openings of the two separation walls 11, 13 are provided at different positions, the three separation passages 31a, 31b, 31c respectively eject the gas mixture to different positions of the combustion catalyst 8. For example, in FIG. 4(a), the separation passage 31a supplies the gas mixture to a section A of the combustion catalyst 8, the separation passage 31b ejects the gas mixture to a section B of the combustion catalyst 8, and the separation passage 31c ejects the gas mixture to a section C of the combustion catalyst 8.

In the section A close to the inlet of the heating layer 3, the gas mixture flowed into the separation passage 31a comes into contact with the combustion catalyst 8 immediately after the flowing. Accordingly, heat is generated through a combustion reaction near the inlet of the heating layer 3 to heat the reforming catalyst 5 in the reforming layer 2 with the wall in between, promoting a reforming reaction near an inlet of the reforming layer 2. Meanwhile, the gas mixture flowed into the separation passages 31b, 31c does not come into contact with the combustion catalyst 8 near the inlet of the heating layer 3. Accordingly, the gas mixture further keeps flowing through the heating passage 25 without a combustion reaction.

In the section B located at a central portion of the heating layer 3, the first separation wall 11 separating the separation passage 31b from the separation passage 31a comes to an end. Thereby, the gas mixture flowing through the separation passage 31b is ejected to the combustion catalyst 8, and a combustion reaction takes place in the section B to generate heat. This heats the reforming catalyst 5 in the reforming layer 2 with the wall in between, promoting a reforming reaction at a central portion of the reforming layer 2.

Furthermore, in the section C located near the outlet of the heating layer 3, the second separation wall 13 separating the separation passage 31b from the separation passage 31c comes to an end. Thereby, the gas mixture flowing through the separation passage 31c is ejected to the combustion catalyst 8, and a combustion reaction takes place in the section C to generate heat. This heats the reforming catalyst 5 in the reforming layer 2 with the wall in between, promoting a reforming reaction near an outlet of the reforming layer 2. Moreover, a wall surface 32 is provided at an outlet of the separation passage 31c, thereby changing the flow of the gas mixture flowing through the separation passage 31c toward the combustion catalyst 8, and the reaction with the combustion catalyst 8 surely takes place.

Note that, at portions where the first separation wall 11 and the second separation wall 13 come to the ends, diffusing members 33, 34 are respectively provided, and play a role of changing the flows of the gas mixtures flowing through the separation passages 31b, 31c in such a manner that the gas mixtures are guided in a direction to the combustion catalyst 8.

In this manner, in the reformer 1 according to the present embodiment, the exothermic reaction takes place in the entire heating layer 3, and a reforming fuel is reformed into a reformed gas.

[Effects of First Embodiment]

As has been described above in detail, in the reformer 1 according to the present embodiment, a gas mixture obtained by mixing a to-be-combusted gas with a combustion-assisting gas is supplied to the heating passage 25; the heating passage 25 is separated into the multiple separation passages by the separation walls 11, 13; and the separation passages respectively eject the gas mixture to different positions of the combustion catalyst 8. Accordingly, with a simple structure not using a pipe or the like, an exothermic reaction can take place widely on the entire combustion catalyst 8. This makes it possible to keep a temperature optimal for a reforming reaction in a large area of the reforming layer 2, and a favorable reforming reaction can take place.

In addition, since the passage can be set wider than a conventional pipe, this makes it possible to introduce the gas mixture to a large area, and an exothermic reaction can take place widely on the entire combustion catalyst 8.

Moreover, in the reformer 1 according to the present embodiment, the diffusion structures configured to diffuse gases are provided to the reforming layer 2 and the heating layer 3. Accordingly, flowing gases are diffused, and the reactions can take place in a large area.

Further, in the reformer 1 according to the present embodiment, the fins 15, 16 arranged in a zigzag manner are provided as the diffusion structures. This enables efficient diffusion of flowing gases with a simple structure.

Additionally, in the reformer 1 according to the present embodiment, the porous metals are provided as the diffusion structures. Accordingly, flowing gases can be diffused more surely.

Furthermore, in the reformer 1 according to the present embodiment, a reformed gas reformed by the reforming layer 2 is supplied as a fuel gas to fuel cells. Accordingly, the utilization as a reformer for fuel cells is possible.

Second Embodiment

Figure 5:
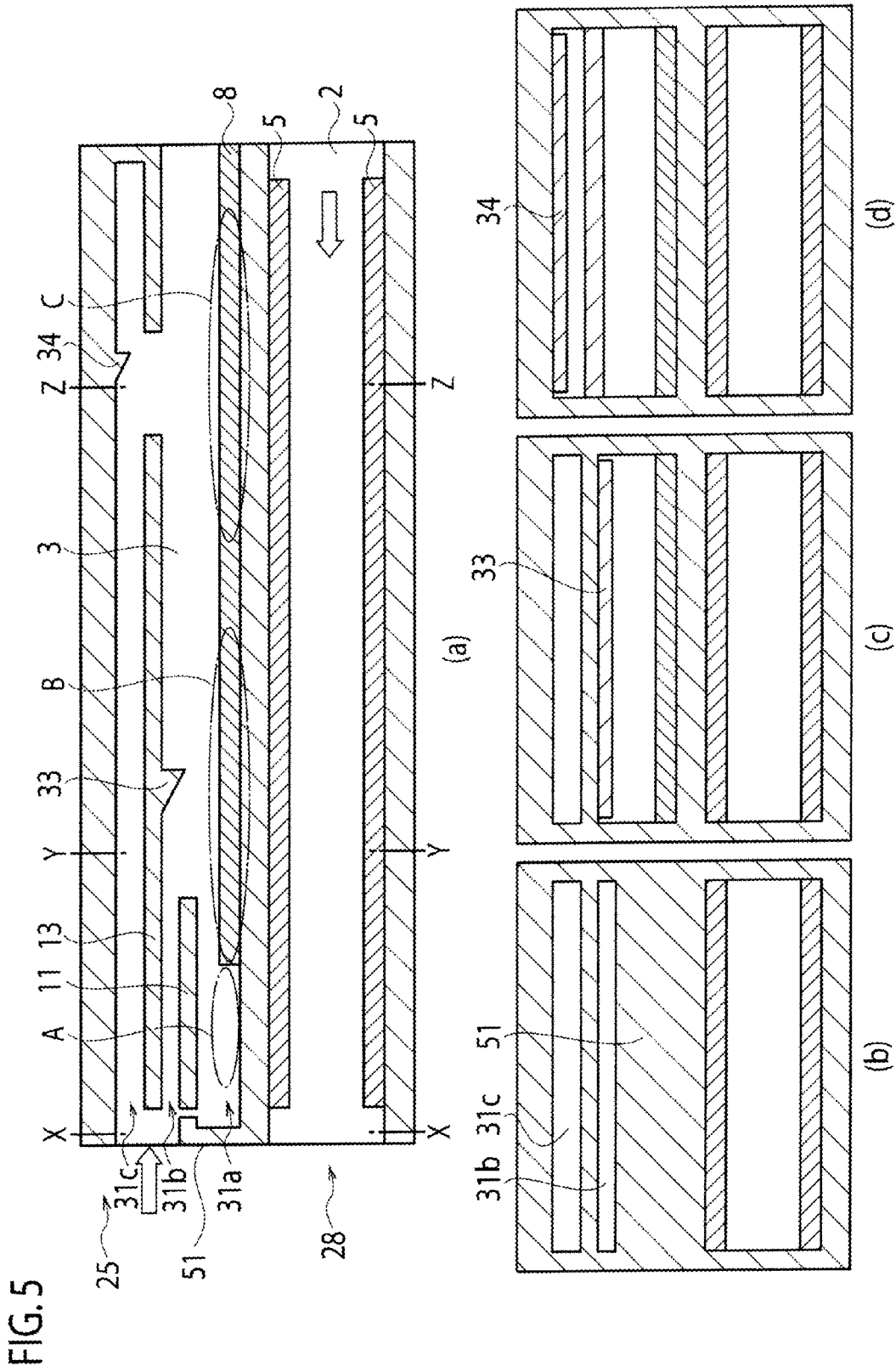
FIG. 5 shows views for illustrating, in detail, cross-sectional structures of a reforming layer and a heating layer of a reformer according to a second embodiment to which the present invention is applied.

Next, a second embodiment to which the present invention is applied will be described with reference to FIG. 5. Note that the same numbers denote the same elements and portions as those in the first embodiment, and the detailed description is omitted. FIG. 5(a) is an enlarged sectional view of the reforming layer 2 and the heating layer 3, and FIGS. 5(b), (c), (d) are respectively cross-sectional views taken along X-X, Y-Y, Z-Z in FIG. 5(a). The description will be given with FIG. 5 of a case where a direction in which a gas flows in the reforming layer 2 is a direction opposite to a direction in which a gas flows in the heating layer 3.

As shown in FIG. 5(a), in a reformer according to the present embodiment, the two first separation wall 11 and second separation wall 13 separate the heating passage 25 in the heating layer 3 into the three separation passages 31a, 31b, 31c in the order closest to the reforming layer 2.

Here, in order to improve the reforming efficiency as the reformer, the heating layer 3 needs to increase the temperature of the section C located near the inlet of the reforming layer 2 so that a reforming reaction can take place the most near the inlet of the reforming layer 2 where a reforming fuel gas is supplied. For this reason, positions where the separation passages 31a, 31b, 31c eject the gas mixture need to be shifted closer toward the inlet side of the reforming passage 28 rather than the outlet side thereof.

Accordingly, in the present embodiment, a wall surface 51 is provided in such a manner that the gas mixture does not flow into the separation passage 31a for supplying a gas mixture to the section A located near the outlet of the reforming layer 2. Thereby, in the heating layer 3 of the present embodiment, the gas mixture thus flowed is separated and continues to flow into the two separation passages 31b, 31c. Hence, a larger amount of the gas mixture is introduced further into the heating passage 25. Thereby, the gas mixture does not flow into the section A close to the inlet of the heating layer 3, which is not coated with the combustion catalyst 8, either; accordingly, no exothermic reaction takes place there.

Meanwhile, since the first separation wall 11 comes to the end in the section B of the heating passage 25 located further than the section A, the gas mixture flowing through the separation passage 31b is ejected to the combustion catalyst 8, and a combustion reaction takes place in the section B to generate heat. This heats the reforming catalyst 5 in the reforming layer 2 with the wall in between, promoting a reforming reaction at the central portion of the reforming layer 2.

Furthermore, since the second separation wall 13 comes to the end in the section C of the heating passage 25 located further than the section B, the gas mixture flowing through the separation passage 31c is ejected to the combustion catalyst 8, and a combustion reaction takes place in the section C to generate heat. This heats the reforming catalyst 5 in the reforming layer 2 with the wall in between, promoting a reforming reaction near the inlet of the reforming layer 2.

As described above, in the present embodiment, the gas mixture does not flow into the separation passage 31a, and only flows into the separation passages 31b, 31c. This enables the positions where the gas mixture is ejected to the combustion catalyst 8 to be shifted closer toward the inlet side of the reforming passage 28 rather than the outlet side thereof. Thereby, the temperature on the inlet side of the reforming layer 2 is increased, and the reforming reaction can be further promoted.

Moreover, it is also possible to change the amount of heat generated at each section of the combustion catalyst 8 on the basis of the cross-sectional area of the separation passages 31a, 31b, 31c. For example, when a ratio of the cross-sectional area between the separation passage 31c and the separation passage 31b is 2:1, the amount of heat generated in the section C of the combustion catalyst 8 can be set approximately double the amount of heat generated in the section B. In this event, by setting a larger cross-sectional area for a separation passage ejecting the gas mixture at a position closer to the inlet side of the reforming passage 28, the reforming reaction of the reforming layer 2 can be further promoted.

[Effects of Second Embodiment]

As has been described above in detail, in the reformer according to the present embodiment, the positions where the separation passages 31a, 31b, 31c eject the gas mixture are shifted closer toward the inlet side of the reforming passage 28 rather than the outlet side thereof. Accordingly, a larger amount of the gas mixture can be supplied to the inlet side of the reforming layer 2 where a large amount of heat generation is required. Thus, the reforming reaction can be promoted by increasing the temperature near the inlet of the reforming layer 2.

Moreover, in the reformer according to the present embodiment, the cross-sectional areas of the separation passages 31a, 31b, 31c are set in such a manner that the cross-sectional area is larger for a separation passage ejecting the gas mixture at a position closer to the inlet side of the reforming passage 28. Accordingly, a larger amount of the gas mixture can be supplied to the inlet side of the reforming layer 2 where a large amount of heat generation is required. Thus, the reforming reaction can be promoted by increasing the temperature near the inlet of the reforming layer 2.

Third Embodiment

Next, a third embodiment to which the present invention is applied will be described with reference to FIG. 6. Note that the same numbers denote the same elements and portions as those in the first and second embodiments, and the detailed description is omitted. FIG. 6(a) is an enlarged sectional view of the reforming layer 2 and the heating layer 3, and FIGS. 6(b), (c), (d) are respectively cross-sectional views taken along X-X, Y-Y, Z-Z in FIG. 6(a).

As shown in FIG. 6(a), in a reformer according to the present embodiment, a separation wall 62 separates the heating passage 25 into two separation passages 63a, 63b. An arrangement of these the separation passages 63a, 63b viewed from the wall surface coated with the combustion catalyst 8 is switched by a switch section 64 provided in the middle of the heating passage 25. Specifically, on an upstream side of the switch section 64, the separation passage 63a is arranged at a position in contact with the combustion catalyst 8; on a downstream side of the switch section 64, the upper and lower passages are reversed, so that the separation passage 63b is arranged at a position in contact with the combustion catalyst 8.

With such a structure, the gas mixtures flowing through the respective separation passages 63a, 63b switch the passages in a vertical direction without being mixed at the switch section 64 and continue to flow. Immediately after flowing into the separation passage 63a, the gas mixture flowed therein comes into contact with the combustion catalyst 8, and heat is generated in the section A near the inlet of the heating layer 3 to heat the reforming catalyst 5 with the wall in between, promoting a reforming reaction near the inlet of the reforming layer 2.

Meanwhile, the gas mixture flowed into the separation passage 63b does not come into contact with the combustion catalyst 8 before the switch section 64, and further keeps flowing through the heating passage 25 without a reaction. Then, at the switch section 64, the upper and lower positions of the separation passage 63a and the separation passage 64b are reversed.

Figure 7:
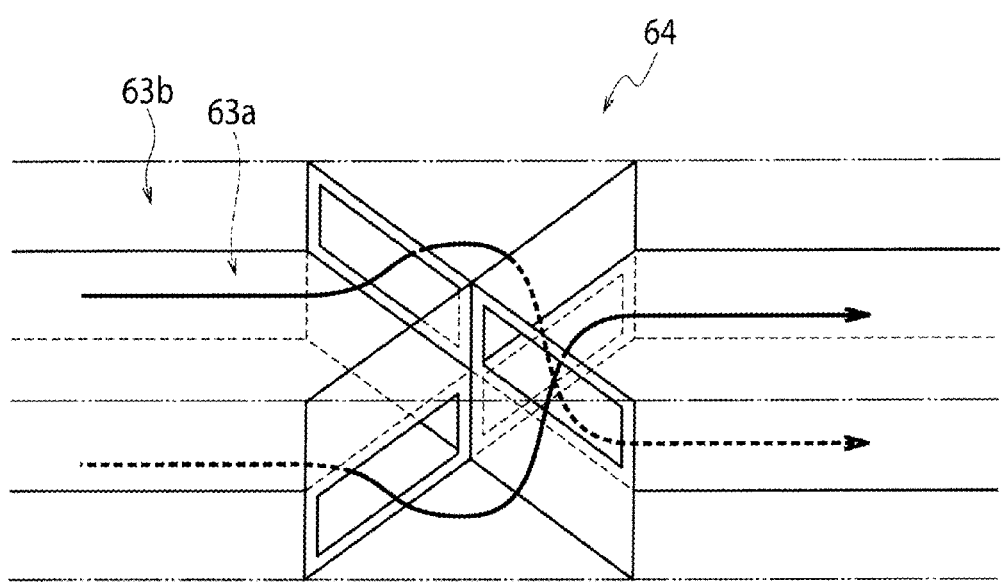
FIG. 7 shows a view for illustrating a structure of a switch section of the reformer according to the third embodiment to which the present invention is applied.

Here, an example of the structure of the switch section 64 will be described with reference to FIG. 7. As shown in FIG. 7, in the switch section 64, a gas mixture flowing through the separation passage 63a on a lower side is shifted to a right side (lower side in FIG. 7), while a gas mixture flowing through the separation passage 63b on an upper side is shifted to a left side (upper side in FIG. 7). Then, each separately passes through a vertically-communicating passage. Thus, the upper and lower positions are reversed. The arrangement is altered such that the separation passage 63a having been located on the lower side is then on the upper side, and the separation passage 63b having been located on the upper side is then on the lower side.

Thereafter, the gas mixture in the separation passage 63b not having been in contact with the combustion catalyst 8 comes into contact with the combustion catalyst 8, and heat is generated in the section B on the outlet side of the heating layer 3 to heat the reforming catalyst 5 with the wall in between, promoting a reforming reaction near the outlet of the reforming layer 2.

Figure 6:
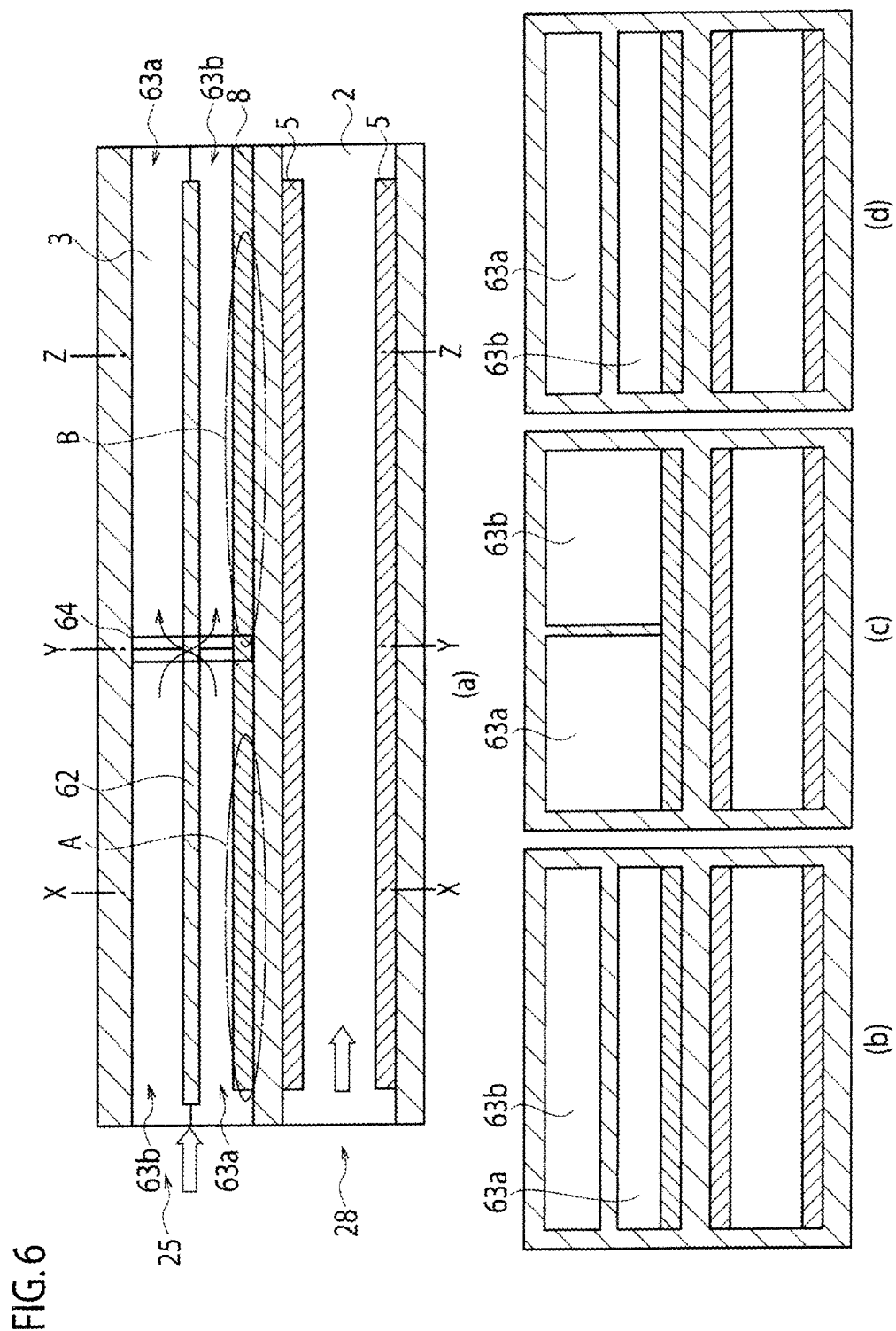
FIG. 6 shows views for illustrating, in detail, cross-sectional structures of a reforming layer and a heating layer of a reformer according to a third embodiment to which the present invention is applied.

Note that, the description has been given with FIG. 6 of the case of two separation passages as an example. Nevertheless, it is possible to provide three or more separation passages by providing multiple switch sections 64.

Moreover, the position where the switch section 64 is provided is preferably located closer to the inlet side of the reforming layer 2 than to the outlet side thereof. For example, when the directions in which gases flow in the reforming layer 2 and in the heating layer 3 are the same, the switch section 64 is disposed closer to the inlet side of the heating layer 3; when the directions in which gases flow in the reforming layer 2 and in the heating layer 3 are opposite, the switch section 64 is disposed closer to the outlet side of the heating layer 3.

Further, cross-sectional areas of the separation passages 63a, 63b are preferably larger for a separation passage closer to the combustion catalyst 8 on the inlet side of the reforming passage 28. For example, when the directions in which gases flow in the reforming layer 2 and in the heating layer 3 are the same, the cross-sectional area of the separation passage 63a is made larger; when the directions in which gases flow in the reforming layer 2 and in the heating layer 3 are opposite, the cross-sectional area of the separation passage 63b is made larger.

[Effects of Third Embodiment]

As has been described above in detail, in the reformer according to the present embodiment, the arrangement of the separation passages is switched in the middle of the heating passage 25. Accordingly, gas mixtures flowing through the respective separation passages are not mixed together, and this makes it possible to prevent dilution of a gas mixture yet to be reacted with a gas mixture having been subjected to a combustion reaction. Thereby, the combustion efficiency can be improved.

Moreover, in the reformer according to the present embodiment, the position of switching the arrangement of the separation passages is located closer to the inlet side of the reforming passage 28 than to the outlet side thereof. Accordingly, more combustion reactions can take place on the inlet side of the reforming layer 2 where a large amount of heat generation is required. Thus, the reforming reaction can be promoted by increasing the temperature near the inlet of the reforming layer 2.

Further, in the reformer according to the present embodiment, the cross-sectional area of a separation passage closer to the combustion catalyst 5 on the inlet side of the reforming passage 28 is set larger. Accordingly, a larger amount of the gas mixture can be supplies to the inlet side of the reforming layer 2 where a large amount of heat generation is required. Thus, the reforming reaction can be promoted by increasing the temperature near the inlet of the reforming layer 2.

Fourth Embodiment

Figure 8:
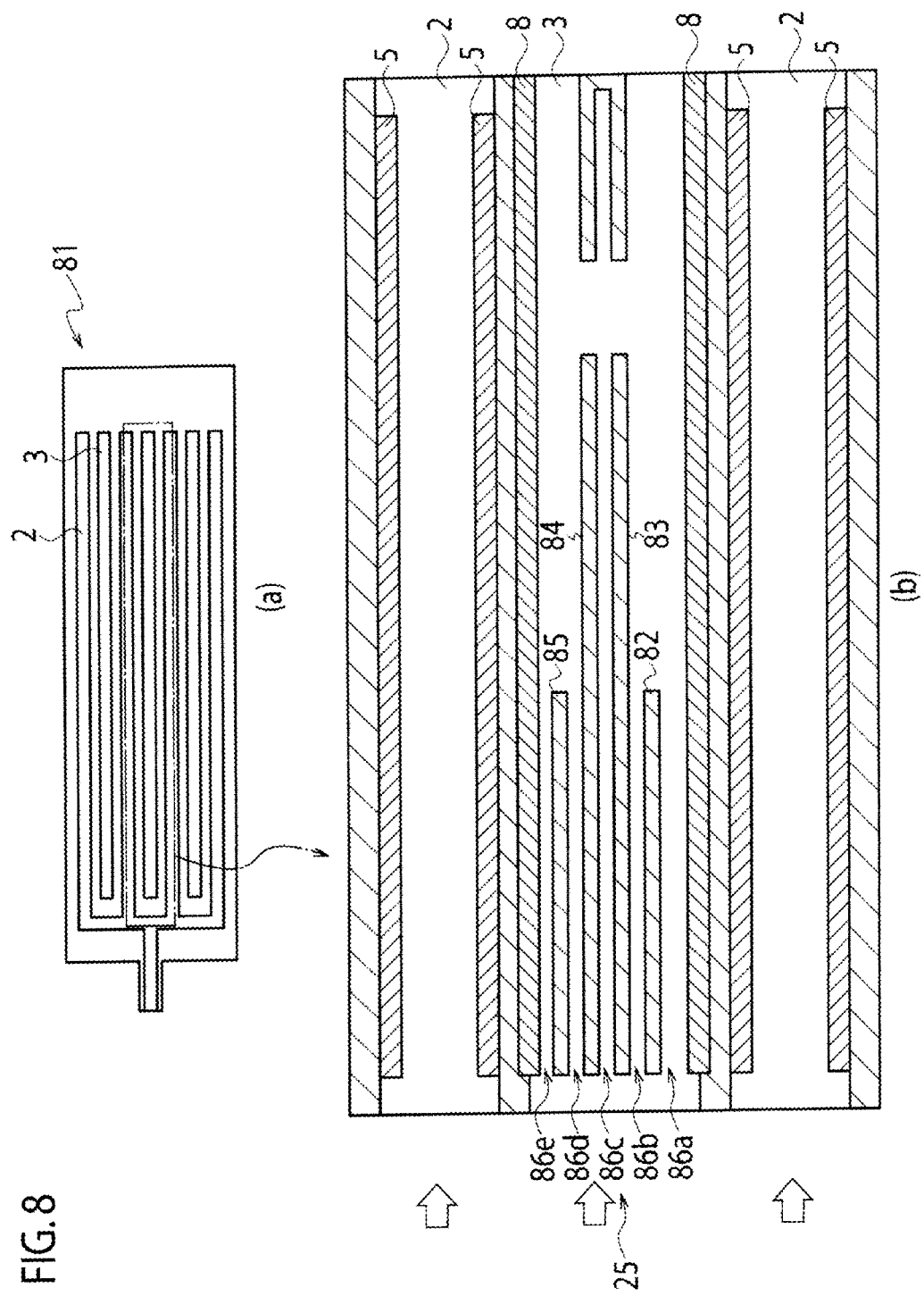
FIG. 8 shows views for illustrating, in detail, cross-sectional structures of a reforming layer and a heating layer of a reformer according to a fourth embodiment to which the present invention is applied.

Next, a fourth embodiment to which the present invention is applied will be described with reference to FIG. 8. Note that the same numbers denote the same elements and portions as those in the first to third embodiments, and the detailed description is omitted. FIG. 8 shows views for illustrating, in detail, cross-sectional structures of the reforming layers 2 and the heating layer 3. As shown in FIG. 8(a), a reformer 81 according to the present embodiment has a structure in which the reforming layers 2 are provided adjacent to both sides of the heating layer 3.

FIG. 8(b) shows an enlarged sectional view of the reforming layers 2 and the heating layer 3 of the reformer 81 having such a configuration. As shown in FIG. 8(b), in each of the reforming layers 2, passage walls on both sides, which are parallel walls, are coated with the reforming catalyst 5; in the heating layer 3 also, passage walls on both sides, which are parallel walls, are coated with the combustion catalyst 8.

The heating layer 3 is separated into five separation passages 86a to 86e by four separation walls 82 to 85, and has a vertically symmetrical structure around the central separation passage 86c.

A gas mixture introduced into the heating layer 3 is a to-be-combusted gas and a combustion-assisting gas mixed in advance, and flows into the heating passage 25. The gas mixture thus flowed is separated and continues to flow into the five separation passages 86a to 86e.

Near the inlet of the heating layer 3, the gas mixtures flowed into the separation passages 86a, 86e come into contact with the combustion catalysts 8 immediately after the flowing. Accordingly, heat is generated through a combustion reaction near the inlet of the heating layer 3 to heat the reforming catalysts 5 with walls in between, promoting a reforming reaction near the inlets of the reforming layers 2.

Meanwhile, the gas mixtures flowed into the separation passages 86b to 86d do not come into contact with the combustion catalysts 8 near the inlet of the heating layer 3, and further keeps flowing through the heating passage 25. Then, the separation walls 82, 85 come to ends at the central portion of the heating layer 3, the gas mixtures flowing through the separation passages 86b, 86d are ejected to the combustion catalysts 8, and heat is generated through a combustion reaction to heat the reforming catalysts 5 with the walls in between, promoting a reforming reaction at the central portions of the reforming layers 2.

Moreover, the gas mixture flowed into the separation passage 86c keeps flowing through the heating passage 25 much further, and is ejected to the combustion catalysts 8 near the outlet of the heating layer 3 as the separation walls 83, 84 come to ends. Then, a combustion reaction takes place near the outlet of the heating layer 3 to generate heat. The reforming catalysts 5 are heated with the walls in between, promoting a reforming reaction near the outlets of the reforming layers 2.

In this manner, in the reformer 81 according to the present embodiment, even if the reforming layers 2 are adjacent to both sides of the heating layer 3, a reforming reaction in the reforming layers 2 on both sides is promoted.

[Effects of Fourth Embodiment]

As has been described above in detail, in the reformer 81 according to the present embodiment, even if the reforming layers 2 are adjacent on both sides of the heating layer 3, an exothermic reaction can take place widely on the entire combustion catalysts 8 with a simple structure. This makes it possible to keep a temperature optimal for a reforming reaction in a large area of the reforming layers 2, and a favorable reforming reaction can take place.

It should be noted that the above-described embodiments are examples of the present invention. Hence, the present invention is not limited to the above embodiments. It is a matter of course that, besides these embodiments, various modifications can be made according to designs, as long as such modifications are within the scope not departing from the technical idea according to the present invention.

This application claims priority based on Japanese Patent Application No. 2011-123128 filed on Jun. 1, 2011, the content of which is incorporated herein by reference.

INDUSTRIAL APPLICABILITY

In a reformer according to one embodiment of the present invention, a gas mixture obtained by mixing a to-be-combusted gas with a combustion-assisting gas is supplied to a heating passage; the heating passage is separated into multiple separation passages by a separation wall; and the separation passages respectively eject the gas mixture to different positions of a combustion catalyst. Accordingly, with a simple structure not using a pipe or the like, an exothermic reaction can take place widely on the entire combustion catalyst. This makes it possible to keep a temperature optimal for a reforming reaction in a large area of a reforming layer, and a favorable reforming reaction can take place. Therefore, the reformer according to one embodiment of the present invention is industrially applicable.

REFERENCE SIGNS LIST 1 reformer
2 reforming layer
3 heating layer
4 outer wall
5 reforming catalyst
6, 9 metal plate
7 metal frame
8 combustion catalyst
10 first metal frame
11 first separation wall
12 second metal frame
13 second separation wall
14 third metal frame
15, 16 diffusion structure
25 heating passage
31a to 31c, 63a, 63b, 86a to 86e separation passage
28 reforming passage
30 fuel cell 33, 34 diffusing member
62, 82 to 85 separation wall
64 switch section

The invention claimed is:

1. A reformer, comprising:
a reforming layer configured to reform a reforming fuel with a reforming catalyst, the reforming layer being stacked with a heating layer configured to heat the reforming layer through an exothermic reaction with a combustion catalyst, wherein
a heating passage in the heating layer is configured to receive a gas mixture comprising a to-be-combusted gas mixed with a combustion-assisting gas,
the heating passage is separated into a plurality of separation passages by a plurality of separation walls parallel to a wall surface coated with the combustion catalyst,
the plurality of separation passages respectively eject the gas mixture to different positions of the combustion catalyst, and
the plurality of separation walls are respectively provided with openings at the different positions.

2. The reformer according to claim 1, wherein
a direction in which the reforming fuel flows in the reforming layer is a direction opposite to a direction in which the gas mixture flows in the heating layer, and
the positions where the plurality of separation passages eject the gas mixture are shifted closer toward an inlet side of a reforming passage in the reforming layer rather than an outlet side thereof.

3. The reformer according to claim 1, wherein
a direction in which the reforming fuel flows in the reforming layer is a direction opposite to a direction in which the gas mixture flows in the heating layer, and
cross-sectional areas of the plurality of separation passages are set in such a manner that the cross-sectional area is larger for a separation passage ejecting the gas mixture at a position closer to an inlet side of a reforming passage in the reforming layer.

4. The reformer according to claim 1, wherein any one of the reforming layer and the heating layer is provided with a diffusion structure configured to diffuse the gas.

5. The reformer according to claim 4, wherein the diffusion structure comprises fins arranged in a zigzag manner.

6. The reformer according to claim 4, wherein the diffusion structure comprises a porous metal.

7. A reformer comprising:
a reforming layer configured to reform a reforming fuel with a reforming catalyst, the reforming layer being stacked with a heating layer configured to heat the reforming layer through an exothermic reaction with a combustion catalyst, wherein
a heating passage in the heating layer is configured to receive a gas mixture comprising a to-be-combusted gas mixed with a combustion-assisting gas,
the heating passage is separated into a plurality of separation passages by respective separation walls parallel to a wall surface coated with the combustion catalyst,
wherein flow in a separation passage disposed in contact with the wall surface coated with the combustion catalyst and a separation passage at a position away from the wall surface is switched in a middle of the heating passage and wherein the respective separation walls are respectively provided with openings at different positions.

8. The reformer according to claim 7, wherein the flow is switched at a location closer to an inlet side of a reforming passage than to an outlet side thereof.

9. The reformer according to claim 7, wherein cross-sectional areas of the plurality of separation passages are set in such a manner that the cross-sectional area is larger for a separation passage closer to the combustion catalyst on an inlet side of a reforming passage.

10. A reformer, comprising:
a reforming layer configured to reform a reforming fuel with a reforming catalyst, the reforming layer being stacked with a heating layer configured to heat the reforming layer through an exothermic reaction with a combustion catalyst, wherein
a heating passage in the heating layer is configured to receive a mixed gas comprising a to-be-combusted gas mixed with a combustion-assisting gas,
the heating passage is separated into a plurality of separation passages by parallel separation walls parallel to a wall surface coated with the combustion catalyst, and
the plurality of separation passages are configured to respectively eject the mixed gas to different positions of the combustion catalyst.

* * * * *